Figure 1:
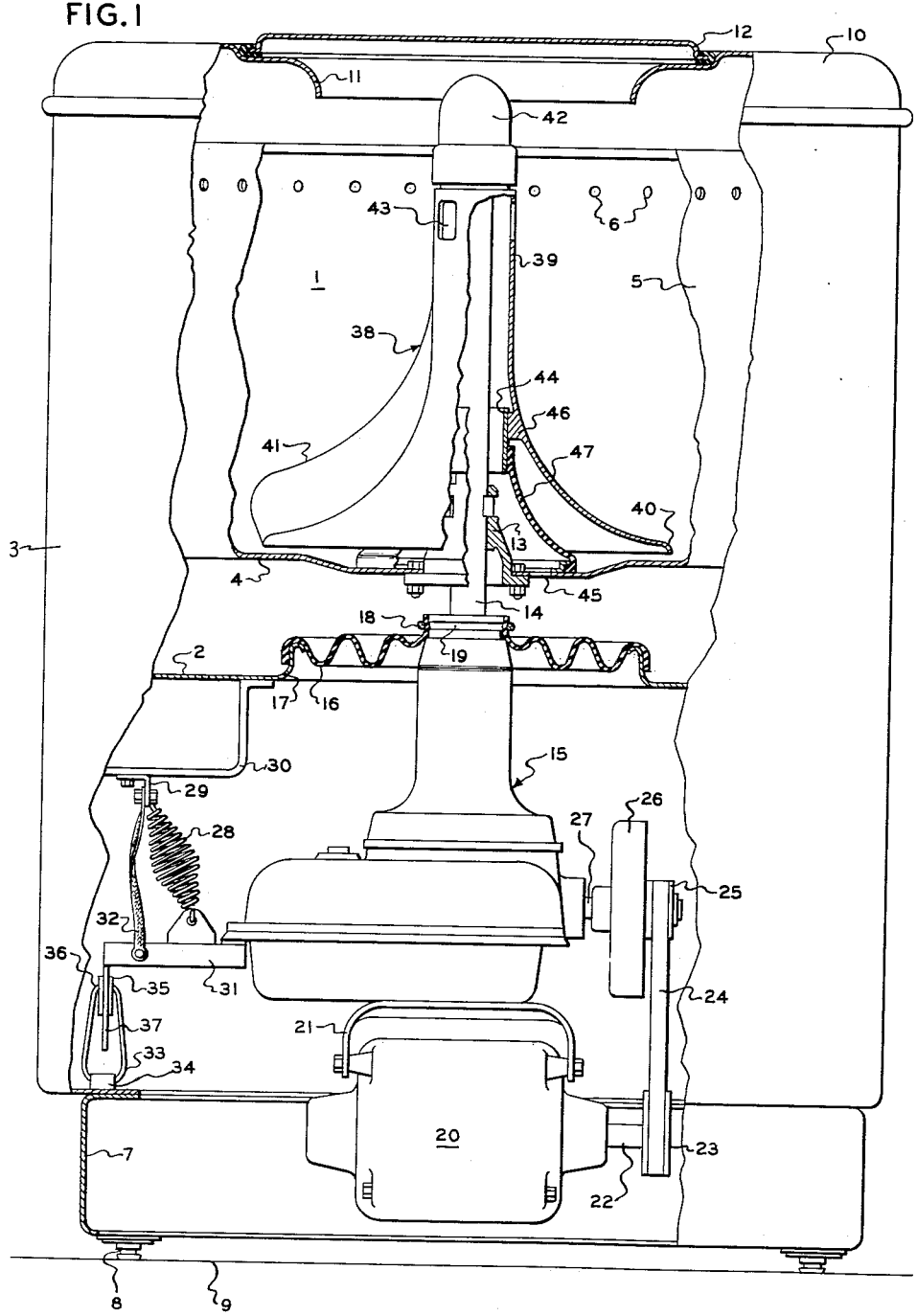

Oct. 18, 1955

C. S. DAYTON 2,720,953

DRIVE MECHANISM FOR AUTOMATIC WASHING
MACHINE AND THE LIKE

Filed Jan. 18, 1954

3 Sheets—Sheet 1

Inventor:
Carl S. Dayton,
by *Sheridan & Ross*
His Attorney.

Oct. 18, 1955
C. S. DAYTON
2,720,953
DRIVE MECHANISM FOR AUTOMATIC WASHING
MACHINE AND THE LIKE
Filed Jan. 18, 1954
3 Sheets-Sheet 2
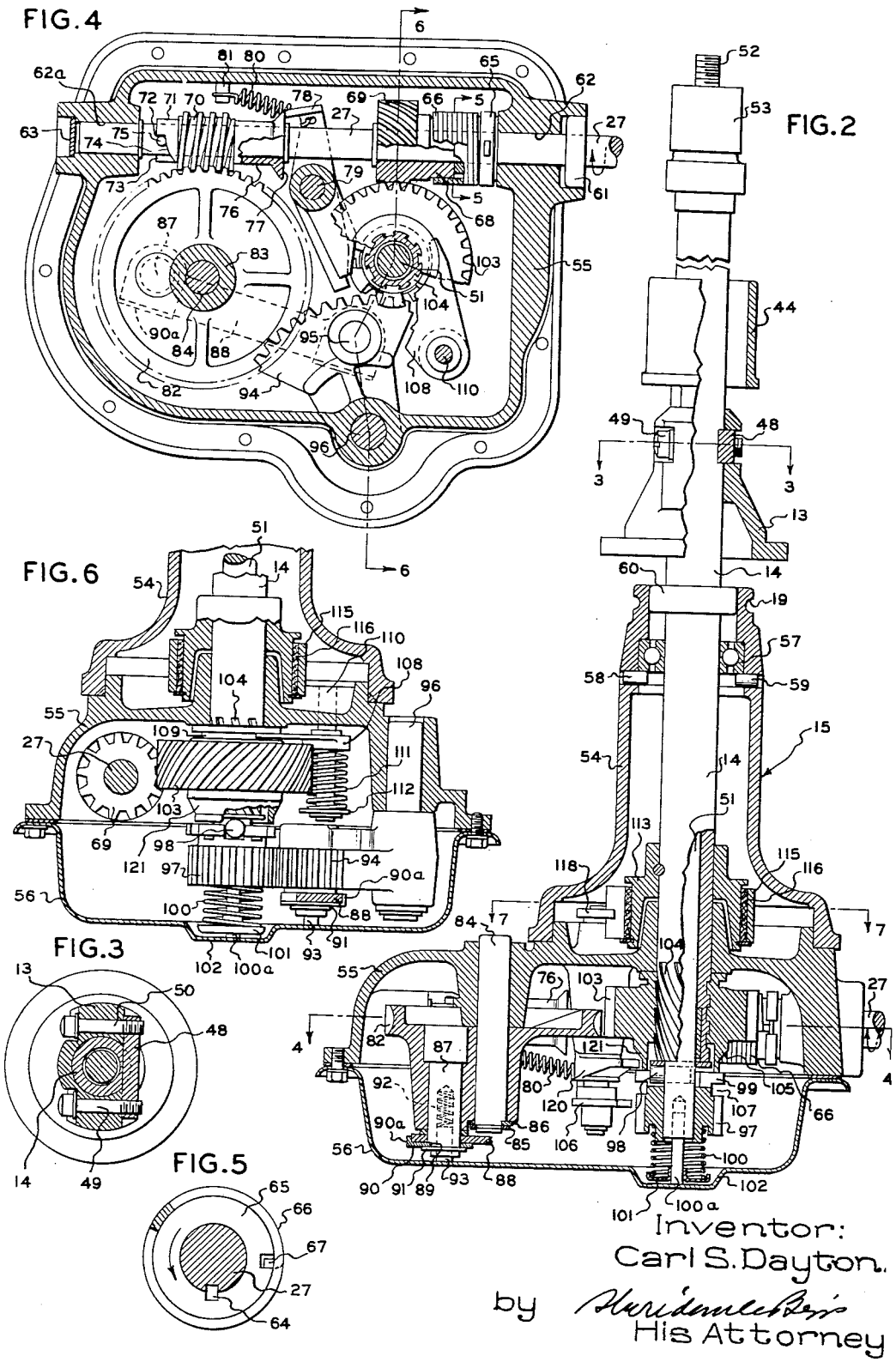
Inventor:
Carl S. Dayton,
by *Hurd nullis* 
His Attorney Oct. 18, 1955  C. S. DAYTON  2,720,953
DRIVE MECHANISM FOR AUTOMATIC WASHING
MACHINE AND THE LIKE
Filed Jan. 18, 1954  3 Sheets-Sheet 3
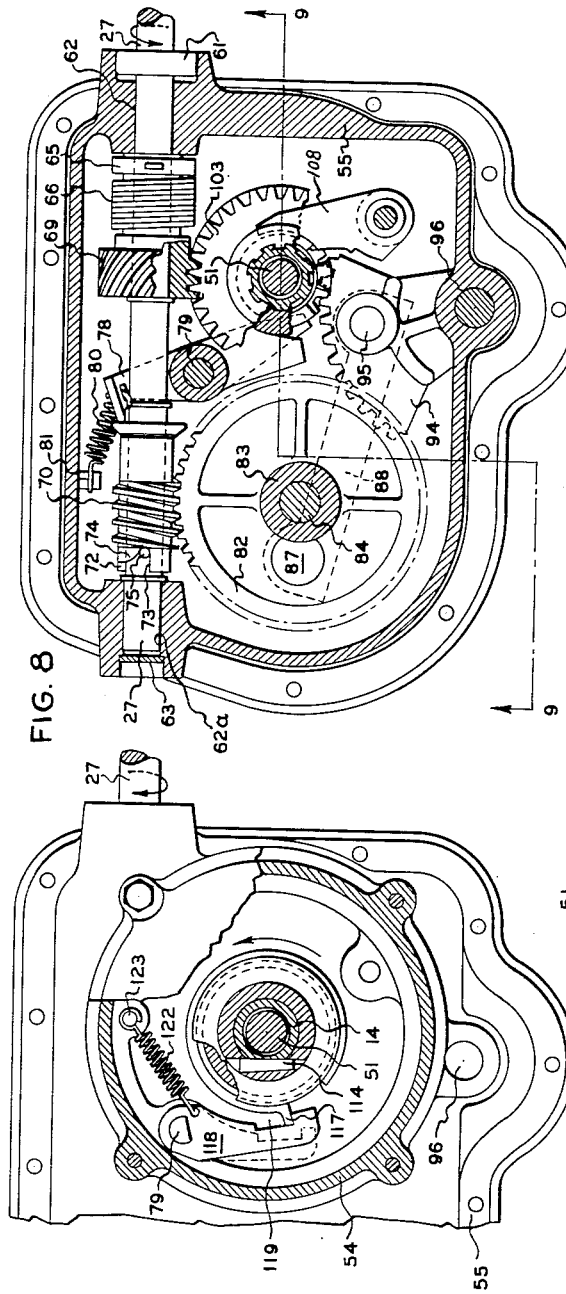
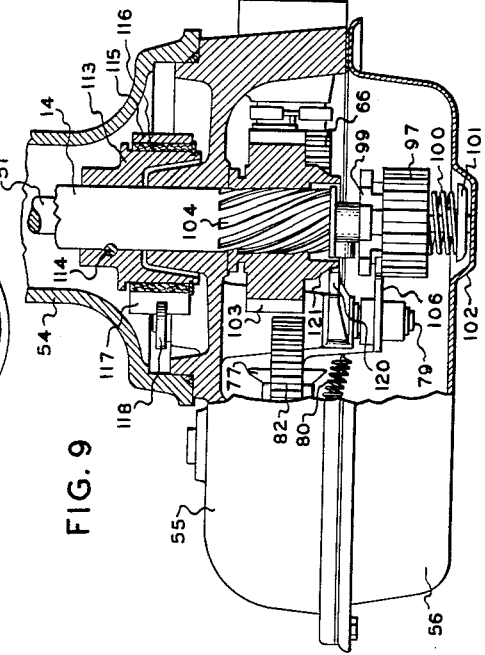
Inventor
Carl S. Dayton,
by Sheridan Ross
His Attorney.

United States Patent Office 2,720,953
Patented Oct. 18, 1955

2,720,953

DRIVE MECHANISM FOR AUTOMATIC WASHING MACHINE AND THE LIKE

Carl S. Dayton, Rexford, N. Y., assignor to General Electric Company, a corporation of New York Application January 18, 1954, Serial No. 404,434

14 Claims. (Cl. 192—3.5)

This invention relates to clothes washing and extracting machines, and more particularly to an improved drive mechanism therefor.

A primary object of my invention is to provide a drive mechanism especially adapted for an automatic clothes washing machine utilizing a single drive motor for driving selectively an agitation shaft for an agitator and a shaft for a spin basket for centrifugal liquid extraction, which drive mechanism is characterized by simplicity, reliability, and low manufacturing cost.

A further object of my invention is to provide a transmission and drive mechanism providing selection of agitation or centrifugal extraction merely by reversal of the main drive motor or power source, thereby eliminating special shifting mechanisms and devices and greatly simplifying the automatic program and sequence control systems.

Another object of this invention is to construct the transmission with separate gear reductions and gear trains for agitation and centrifugal extraction, respectively, which gear trains are constantly in engagement or mesh, with improved means for automatically selecting agitation or extraction dependent upon direction of input rotation.

Still another object of this invention is to control the transmissions and the application of a spin basket brake as necessary in the machine operation, by utilizing gear reaction forces, thus eliminating the usual power operators previously required in such power transmissions for automatic washing and drying machines.

More specifically, objects of my invention include automatic clutch operation by gear reaction forces as well as control of a brake by gear reaction forces, and in which both functions are accomplished by transmission components normally required in such a mechanism.

Briefly stated, in accordance with one aspect of my invention, I provide an oscillatory drive for an agitator shaft and high-speed rotation for a spin basket shaft with selection of agitation or extraction dependent upon the direction of rotation of a single input drive shaft. An over running clutch provides a one-way driving connection with the spin shaft, with the driven spin shaft gear connected to the spin shaft by means such as a spline to permit axial movement and thrust when driven as a result of gear reaction forces. The agitator drive includes a driven member and disengageable clutch means, which clutch is disengaged by the reaction force between the driving and the driven spin shaft gears. This same gear reaction force is employed to control automatically a brake on the spin shaft. Gear reaction force from the agitator drive is employed to operate latch means for the agitation clutch, preventing re-engagement until agitation is again scheduled.

My invention will be better understood from the following description taken in connection with the accompanying drawings and its scope will be pointed out in the appended claims.

In the drawings, Fig. 1 is a side elevation of a washing machine embodying this invention, with portions thereof broken away and partially sectionalized to illustrate details; Fig. 2 is an enlarged cross-sectional elevation of the drive mechanism for the device illustrated by Fig. 1, in one of its operative positions; Fig. 3 is a cross-sectional view on the line 3—3 of Fig. 2; Fig. 4 is a cross-sectional view taken on the line 4—4 of Fig. 2; Fig. 5 is a cross-sectional view taken on the line 5—5 of Fig. 4; Fig. 6 is a partial cross-sectional view taken on the line 6—6 of Fig. 4; Fig. 7 is a partial cross-sectional view taken on the line 7—7 of Fig. 2; Fig. 8 is a cross-sectional view through the mechanism similar to Fig. 4, but with the components in a different operative position; Fig. 9 is a cross-sectional view taken on the line 9—9 of Fig. 8; and Fig. 10 is a partial cross-sectional elevation through the mechanism similar to Fig. 2 but with the components in a different operative position.

While this invention is not necessarily limited to a clothes washing machine, it is of particular application thereto since such machines commonly require a drive to a washing or agitation means and a separate drive to a liquid extraction means. For obvious economy reasons it is highly desirable to drive both the extraction and agitation means from a single power source or motor. It is to such a construction that this invention is particularly directed, that is the use of a single driving motor for operating two separate output shafts with selection of the drive to either of the output shafts dependent upon the direction of rotation of the driving motor.

Referring now to Fig. 1 of the drawings, the washing machine selected for exemplification of my invention is of the type including a rotatable clothes basket 1 enclosed within a tub structure 2 which in turn is supported on and enclosed by an outer cabinet structure 3. Basket 1 is of the type having a substantially imperforate bottom wall 4 with an upwardly and outwardly flaring side wall 5, also imperforate with the exception of a row of orifices 6 adjacent the upper edge thereof and at the maximum basket diameter. Thus, when basket 1 is rotated, liquid under the influence of centrifugal force climbs the sidewalls of the basket and is discharged through orifices 6 into the outer tub.

The cabinet structure also includes a supporting base framework 7 with a plurality of adjustable supporting feet 8 thereon for leveling the machine on a floor surface 9. The machine also includes a top cover 10, having an access aperture 11 therein which may be closed by a removable lid 12.

Basket 1 is supported within the machine on its hub structure 13 bolted or otherwise secured to bottom wall 4 of the basket. Hub structure 13 is non-rotatably clamped to a spin tube 14, which is rotatably mounted within a transmission casing assembly indicated in Fig. 1 generally by the reference numeral 15. Since clothes distribution within basket 1 during centrifugal extraction is entirely fortuitous, it must be anticipated that conditions of static and dynamic unbalance will exist. Therefore, basket 1 along with the transmission are resiliently suspended for motion with respect to stationary tub 2. To permit such relative motion, a flexible boot 16 is employed between a flanged aperture 17 in the bottom wall of the tub and the transmission casing assembly. The flexible boot or diaphragm 16 is made up of a material such as rubber, impervious to the washing liquid, with a number of convolutions to increase its flexibility. By means well known in the art, a liquid tight seal is provided at the junction of the diaphragm with the aperture defined by flange 17 of the tub; and similarly a liquid seal results from the use of a clamping ring 18 compressing an edge of the diaphragm in an annular groove 19 adjacent the upper edge of the casing assembly 15.

The transmission assembly includes, of course, a driving source such as an electric motor 20 carried on a yoke 21 attached to the gear case assembly. The output shaft 22 of the motor includes a driving pulley or sheave 23 for transmission of driving torque through a flexible belt 24 to a clutch pulley 25. This clutch assembly includes an outer drum and hub structure 26 keyed or secured to the input driving shaft 27 of the transmission and drive mechanism. While no details are shown herein with respect to clutch 26, it is to be understood that any of the well known centrifugal clutches may be employed, such clutches being of the type permitting the motor to start without load and engaging in driving relation responsive to speed.

As previously noted, the entire transmission assembly and basket structure are suspended within the cabinet structure by means such as resilient tension springs 28, each carried from a bracket 29 and supporting framework 30 forming a part of the stationary system including tub 2 and cabinet 3. The opposite end of each of the supporting springs 28 is connected to a bracket arm 31 rigidly secured to gear case assembly 15. While only a single spring 28 is shown by Fig. 1, it is to be understood that a plurality of such suspension springs are employed in equiangularly spaced relation to provide a stable suspension tending to retain basket 1 in an upright position, but allowing freedom for gyration resulting from unbalanced loads within the basket. Maximum extension of a spring 28 may be limited by employment of a flexible strap 32 between the supporting structure 30 and the arm 31. Preferably the suspension arrangement also includes means for damping excessive vibrations and limiting the excursion during gyration. Such means is herein shown as including a hairpin spring member 33 secured to cabinet 3 by an attaching bracket 34. The upper end of the spring member 33 includes a pair of friction plates 35 and 36 adapted to be positioned on opposite sides of a plate 37 forming a part of supporting arm 31. The hairpin spring 33 is prestressed to compress the friction plates against the opposite sides of plate 37 whereby vibrational energies from the moving system are damped and dissipated as heat from the relative motions of plate 37 with respect to the friction pads 35 and 36. Such constructions, of course, are well known in the art and form no part of the invention claimed herein.

The clothes washing means employed in accordance with this disclosure is an agitator indicated generally at 38 in Fig. 1, of the type adapted to be driven with an oscillatory or to and fro motion to impart cleansing movement to articles within the basket and the washing liquid. As shown it includes a hollow center post portion 39 and an outwardly flaring skirt 40 with a plurality of upwardly extending radial vanes 41 thereon. The agitator is removably held in position by means of an acorn nut 42 at the upper end of the center post. A plurality of overflow apertures such as 43 may be provided adjacent the upper end of center post 39 of the agitator. A liquid passage is defined within the hollow center post and downwardly within the agitator, through a spider and bearing member 44, and an aperture 45 in the bottom wall of the basket. The spider and bearing member 44 forms an exterior bearing surface on the spin tube for a molded hub 46 on the inside of agitator 38. A liquid seal between the inside of the basket and aperture 45 in the bottom wall of the basket adjacent hub 13 is provided by a boot 47. Apertures 43 in the agitator thus define the liquid level in basket 1, and any overflow passes downwardly through the hollow agitator into the outer tub 2.

The structure thus far described represents a more or less conventional clothes washing machine construction of the type to which my transmission in accordance with this invention is particularly directed. It has been described briefly by way of background for a better understanding of the nature of the drive mechanism claimed in this application.

Referring now to Figs. 2–6 I have shown my drive mechanism in detail, Fig. 2 representing an enlarged cross-sectional view of transmission assembly 15. The basket hub 13 as previously noted is keyed to spin tube 14 by means such as a drive plate 48 held in contact with a flat on the spin tube shaft by a pair of machine screws 49 and 50, clearly illustrated by Fig. 3. Rotatably positioned within spin tube 14 is an agitator shaft 51 terminating at the upper end in a threaded portion 52 and drive block 53 for agitator 38.

The transmission casing as herein shown is made up in three sections with an upper section 54 secured to a central section 55 having bolted or otherwise secured thereto a formed base pan 56. Spin tube 14 is journaled with respect to upper section 54 of the casing by a suitable bearing structure 57 positioned against a shoulder within the casing and held in position by pins 58 and 59. A seal assembly indicated generally at 60 may be provided between the spin tube and the upper portion of the casing. Similarly, the input driving shaft 27 enters the casing through a lubricant seal 61 and is journaled in the casing at 62. The opposite end of the input drive shaft is also journaled in the intermediate section of the transmission casing at 62a with a plug 63 sealing the bearing from the exterior. It may be noted in this connection that the entire transmission assembly is completely sealed so that a lifetime supply of lubricant may be placed therein at the time of manufacture.

In Figs. 2–6, the components are shown in the position occupied during drive of the washing means or agitator 38. As clearly shown by Figs. 4 and 5, the input drive shaft 27 has keyed thereto by key means 64 a clutch hub 65 for a one-way driving clutch member 66. This clutch is herein shown as a spring clutch having an end tab 67 engaging in a notch in hub 65, so that the spring clutch is rotated upon rotation of driving shaft 27. Spring clutch 66 also encircles the hub 68 (Fig. 4) of a spiral driving gear 69, hereinafter referred to as the spiral driving or spin driving gear. The spring clutch 66 is so wound or formed that it tends to increase its diameter or open up upon rotation in the direction of the arrow in Figs. 4 and 5. The spiral driving gear 69 is loosely journaled on driving shaft 27. Therefore, upon input rotation in the direction of the arrow in Figs. 2, 4 and 5, this clutch overruns and fails to provide any appreciable driving input torque to gear 69.

Also journaled on shaft 27 is an agitator drive means here shown as a worm 70 having a hub 71 at its left-hand end, as viewed in Fig. 4, with a pair of driving shoulders 72 and 73 connected by a cam surface 74. Shoulders 72 and 73 as well as cam surface 74 are engaged by a driving pin 75 projecting transversely from driving shaft 27. The opposite end of worm 70 includes a hub 76 having an outwardly flanged end 77 thereon for engagement with a pivoted lever 78 journaled on a generally vertically extending shaft 79. Lever 78 is biased to rotate in a counterclockwise direction, as viewed in Fig. 4, by means such as a tension spring 80 having one end thereof connected through an aperture in the lever and its opposite end anchored on a pin 81 secured to the outer casing. Thus, while worm 70 is journaled not only for rotation but also axial movement on drive shaft 27, it is resiliently biased by means of lever 78 and spring 80 to its left-hand position as viewed in Fig. 4.

The agitation drive from worm 70 proceeds through a worm gear 82 having its hub 83 journaled on a shaft 84 anchored in the intermediate section of the transmission casing. Gear 82 is supported on shaft 84 by a snap ring 85 (Fig. 2) and bearing washer 86 in a conventional manner. Worm gear 82 includes an eccentric driving pin 87 loosely received therein for connection to an oscillation drive link 88 by means including a washer 90 keyed to a flat 89 on pin 87 with tab 90a to prevent pin 87 from rotating with respect to link 88. The link and washer are held in position by a snap ring 91. The eccentric pin 87 may be forced upwardly into position within gear 82 by a compression spring 92 and pin 93 riding on the base pan 56 of the casing. Oscillation drive link 88 is pivotally connected to a sector gear 94 by means of a pin 95. Sector gear 94 is rotatably supported by the transmission casing on a shaft 96. The sector gear in turn is constantly in mesh with an agitator drive pinion 97 loosely journaled on agitator drive shaft 51 (Fig. 2). With this arrangement, whenever drive shaft 27 is rotated, worm 70 through worm gear 82 and the eccentric or oscillation link 88 continuously oscillates sector gear 94 to drive the agitator pinion 97 with an oscillatory motion.

Agitator drive pinion 97 is connected to the agitator shaft 51 through a clutch connection including a transverse pin 98 in the agitator shaft engageable in any one of a plurality of cross slots 99 on the upper end of the agitator pinion. The agitator pinion is axially slidable as well as rotatable with respect to the agitator shaft, but is biased to the upper or clutch engaged position by means of a compression spring 100 seated at its upper end in an annular slot in the agitator pinion and at its lower end bearing against a cup shaped washer 101 adapted to ride in a recess 102 in the transmission casing base pan. A guide pin 100a may be employed to center the spring washer 101 with respect to the axis of the agitator shaft.

In Figs. 8 and 10, I have shown the position of the components, in views similar to Figs. 4 and 2 respectively, in the relationships for the spin or centrifugal extraction drive. As shown, the input driving shaft 27 is rotating in the opposite direction from that shown in Figs. 2 and 4, as indicated by the arrows on Figs. 8 and 10. Under these conditions, spring clutch 66 tends to wind up more tightly, thereby engaging the hub of spiral driving gear 69 to connect this gear to the input driving shaft. By comparison of Figs. 4 and 8 it may be noted that drive pin 73 for worm 70 has now traversed from the shoulder 72 to shoulder 73 on the worm hub. By virtue of the inclined cam surface 74, worm 70 has been permitted to move to the left under the influence of tension spring 80 as well as its own driving reaction with worm gear 82. Worm 70, however, continues in mesh with worm gear 82 whereby an oscillatory drive continues to agitator pinion 97.

A driving connection to spin tube 14 is accomplished by means of a spiral driven gear 103 constantly in mesh with the spiral driving gear 69. By selection of the proper relative sizes of spiral gear 69 with respect to driven gear 103, the desired speed reduction can be obtained. The spiral driven gear is non-rotatably associated with the spin tube, but is axially movable thereon through a spline connection in the form of a spiral spline 104 (Figs. 9 and 10) angling downwardly toward the right, whereby driving reaction of gear 69 with gear 103 moves gear 103 downwardly to the position shown by Fig. 10. The spiral spline is preferred to a straight spline to reduce friction on this downward motion. Spiral driven gear 103 includes on its lower portion a recessed area as defined by a downwardly projecting annular flange 105 of an internal diameter slightly exceeding the diameter of agitator shaft 51 and the transverse pin 98 carried thereby. Annular flange 105 furthermore engages with the upper surface of agitator pinion 97 upon downward movement as described to force pinion 97 downwardly compressing spring 100, thereby disengaging drive pin 98 from the agitator pinion. In view of the fact that pinion 97 is journaled on the agitator shaft, the agitator drive to shaft 51 is disengaged during drive of the spin tube. The agitator therefore is free to rotate with the basket under the influence of frictional bearing drag as well as liquid drag within the basket.

Whenever the driving motor is de-energized and torque input through driving shaft 27 ceases, following a spin operation, the inertia of the rapidly rotating basket results in a reverse thrust from the spin tube 14 through spiral gear 103 and spiral gear 69. Under these conditions, i. e. with the basket acting as the driving member, spiral driven gear 103 rides upwardly on the spiral spline 104, releasing the engagement with agitator pinion 97. However, it is essential that the agitator pinion remain out of engagement with the agitator shaft until the basket has come to rest, for otherwise there would be relative motion of the agitator with respect to the basket with a destructive effect upon articles of clothing within the basket. In other words, it is essential to avoid so-called "dry agitation." For this purpose, lever 78 engaging flange 77 of the agitator drive worm 70 includes a downward extension terminating in a latch or detent arm 106 engageable within an annular groove 107 in the agitator pinion. By an examination of Figs. 8 and 10, it is seen that worm 70, during any rotation of drive shaft 27 in the spin direction, occupies its extreme left-hand position allowing lever 78 to pivot about its axis in a counterclockwise direction as viewed in Fig. 8. This rotation results in the engagement of detent arm 106 in the annular groove 107 of the agitator pinion to prevent its upward movement into engagement with drive pin 98. However, as soon as input driving torque in the agitation direction (Fig. 4) is resumed, worm 70 moves to its extreme right-hand position to rotate lever 78 in a clockwise direction, and thus disengage detent 106 from agitator pinion 97, permitting its upward movement under the influence of biasing spring 100 to engage drive pin 98 in one of the lateral slots 99. In others words, the agitator clutch is automatically disengaged at the beginning of spin by utilizing driving reaction forces of the spin gearing; and is automatically re-engaged by driving reaction force of the agitation gearing.

To insure that spiral driven gear 103 returns to its uppermost position on spline 104 upon completion of operation and under all conditions, I provide a biasing means shown most clearly by Fig. 6. This means may comprise a lifting yoke 108 having the arms thereof engaging an annular groove 109 in the upper hub of the spiral driven gear. Yoke 108 is slidably carried on a pin 110 anchored within the transmission casing, which pin carries a compression spring 111 forcing yoke 108 upwardly, by virtue of its bearing against a washer 112 held in position on the lower end of pin 110.

Following completion of the centrifugal extraction operation, it is desirable to bring the rapidly rotating basket to rest as quickly as possible. Furthermore, for safety reasons it is preferable that an automatic brake be employed for stopping the basket at any time when power is removed from the machine. The nature of the particular brake construction in accordance with a preferred embodimetn is best shown by Figs. 7, 9 and 10. A brake drum 113 is keyed to spin tube 14 by means such as a taper pin 114. A brake band 115 encircles this drum and includes a lining of friction material 116 in contact with the drum. Brake band 115 includes an outwardly extending tab 117 thereon, which is adapted to be engaged by a brake latch member 118. Latch member 118 includes an elongated notch 119 adjacent the outer end thereof to prevent rotation of the brake band and thus apply a braking force when the spin tube is rotating in the direction of the arrow in Fig. 7. This arrangement of the notch 119 cooperating with tab 117 of the brake band provides not only retardation of the basket upon completion of spin, but also snubbing or braking action during agitation. This latter characteristic is desirable to increase the effectiveness of washing action by retaining basket 1 stationary during agitation. Figs. 2, 7 and 9 show the components with brake engaged; in Fig. 10 the brake is disengaged, latch member 118 being clear from brake tab 117.

In accordance with this invention, the brake is automatically controlled responsive to driving reaction in the spin drive gear train. As clearly shown by Fig. 7, the brake latch arm 118 is nonrotatably associated with the upper end of shaft 79, which is journaled within the transmission casing structure. Upon this same shaft is journaled the agitator latching means as previously described, so that the one shaft serves the dual function. Also nonrotatably associated with shaft 79, along with brake latch 118, is a brake operating arm 120 (Fig. 9). Arm 120 is rotated along with shaft 79 and the brake latch by means of a cam surface 121 formed on the exterior surface of annular flange 105 of the spiral driven gear. As noted by the prior description, when shaft 27 is rotated in the so-called spin direction (Figs. 8 and 10) the reaction produced by spiral gears 69 and 103 results in downward movement of the spiral driven gear, which downward movement by virtue of cam surface 121 acting on brake operating arm 120 rotates the arm in a clockwise direction, as viewed in Fig. 7, to rotate the brake arm to the dotted line position. As clearly illustrated this releases the brake band for rotation with the spin tube. As soon as spin drive ceases, however, spiral driven gear 103 again rises on the spiral spline, permitting return of the brake latch arm under the influence of tension spring 122 connected at one of its ends to the brake latch arm and at its opposite end to a pin 123 fixed in the transmission casing.

The nature of this machine and of my invention may be better understood by a review of a typical sequence of operations. Assuming that basket 1 has been loaded with the articles to be washed and the necessary quantity of washing liquid and detergent, agitation is commenced by energizing motor 20 for rotation in the direction indicated by the arrows on Figs. 2 and 4. The motor attains normal operating speed in a very short period of time by use of centrifugal overload protection clutch 26. Input rotation of drive shaft or worm shaft 27 as illustrated by Figs. 2 and 4 drives agitation worm 70 by contact of transverse pin 75 in the shaft engaging shoulder 72 on the worm hub. Spiral driving gear 69 is not driven in view of its connection to shaft 27 by the one way clutch 66. In other words, the spring clutch 66 is loosely riding on hub 68 of the spiral driving gear. Cam surface 74 on the hub of worm 70 has forced the worm to the right as viewed in Fig. 4, which through flanged end 77 on the worm has rotated agitator pinion latch arm 78 in a clockwise direction around the axis of shaft 79. Agitator pinion 97 is therefore freed for upward axial movement on agitator shaft 51 under the influence of compression spring 100. This upward movement of the agitator pinion is effective to engage the agitator clutch, consisting of transverse pin 98 in the the agitator shaft and a cross slot 99 in the upper end of the pinion. Rotation of worm gear 82 as driven by worm 70, through the eccentric connection 87 and the oscillation link 88 effectively moves sector gear 94 with an oscillatory or to and fro motion. Sector gear 94 is in mesh with agitator pinion 97, thereby oscillating the agitator shaft and the agitator 38 within basket 1 to impart the desired washing movement to the liquid, detergent, and articles of clothing.

Throughout the agitation period, the spiral driven gear 103 is in its uppermost position under the influence both of the spiral gears 69 and 103 and the compression spring 111 operating through yoke 108 and annular groove 109 in this gear to force it into its upper position. Brake latch arm 118 is therefore pulled into engagement by spring 122 (Fig. 7) with the outwardly extending tab 117 on the brake band preventing rotation of the band. Thus, a braking force is applied to the spin tube through brake drum 113 keyed thereto. Agitation may continue for the desired period of time under control of a conventional sequence controller (not shown).

Upon conclusion of the washing operation, the liquid is extracted from the clothes and thrown outwardly from the basket through apertures 6 by rapidly rotating the basket. This drive for rotating the basket is accomplished by reversing the direction of rotation of motor 20 thereby reversing the direction of rotation of input worm shaft 27. With the shaft now rotating in the direction of the arrows in Figs. 8 and 10, hub 65 on the shaft along with spring clutch 66 rotate in a direction tending to wind the spring clutch more tightly and decrease its diameter. This action of the spring clutch firmly engages hub 68 of the spiral driving gear 69, whereby gear 69 rotates with shaft 27. Gear 69 is constantly in mesh with its mating driven gear 103, which in turn is connected to the spin tube 14 by means of the spiral spline 104. It is to be understood that this spline connection allows both relative rotation to a limited extent, as well as limited axial movement of gear 103 on the spin tube. However, any relative rotational movement has a corresponding axial movement. The drive of gear 69 to gear 103 produces a downward thrust on gear 103 causing driven gear 103 to move downwardly to accomplish two functions. The first is to disengage the agitator clutch by forcing agitator pinion 97 downwardly compressing spring 100. The depending annular flange 105 of the spiral driven gear is of sufficient diameter to pass over driving pin 98 on the agitator shaft, to disengage the agitator clutch. A second function accomplished by the downward movement of the spiral driven gear is to release the brake, consisting of brake drum 113 and band 115. The brake drum as illustrated is keyed to the spin tube while the brake band is normally free to rotate with the drum unless restrained by engagement of the band by brake latch arm 118. However, the downward movement of spiral driving gear 103, by means of cam surface 121 acting on arm 120 effectively rotates brake latch arm 118 out of engagement with the brake band tab and against the bias of spring 122. The spin tube is therefore free to rotate and is driven at the desired centrifugal extraction speed through the gear train consisting of spiral gears 69 and 103.

Upon conclusion of the centrigual extraction operation, power is removed from motor 20. Thereupon, basket 1 rotating at a high speed becomes the driving means tending to continue the components in motion. The reaction between spiral gear 69 and spiral driven gear 103 is reversed, tending to cause the spiral gear to rise. This upward motion of the spiral gear is positively assured by compression spring 111, yoke 108, and annular groove 109 as illustrated by Fig. 6. As the spiral driven gear rises, brake operating arm 120 is allowed to rotate inwardly along with brake latch arm 118 under the influence of tension spring 122 (Fig. 7). Brake band 115 and its outwardly projecting tab 117 up to this moment were rotating in synchronism with the basket and spin tube. However, further rotation of the brake band is now arrested by the latch arm to provide a braking force retarding the continued rotation of the basket. The components are now in the position illustrated by Figs. 7 and 9.

Re-engagement of the agitator clutch is prevented by agitator latch 106 in the annular groove 107 of the agitator pinion. This engagement of the latch results from the shift of agitator worm 70 to the left (Fig. 8) during the spin drive. Upon conclusion of spin rotation, the worm remains in this same position under the influence of tension spring 80 as previously described. Therefore, the latch arm 106 is in the position shown by Fig. 9 to prevent the upward movement of agitator pinion 97.

If at any time it is desired to again cause operation of the agitator, it is merely necessary to energize motor 20 to provide input driving torque in the direction illustrated by Figs. 2 and 4. The first rotation of shaft 27 along with driving pin 75 in cooperation with cam surface 74 in the worm hub results in movement of the worm to the right as viewed in Figs. 4 and 8, thereby to release the agitator pinion latching means. Spring 100 again forces the pinion upwardly to engage the agitator clutch as previously described and the cycle may continue in the same manner.

It is to be noted in particular from the above description that two gear drive systems are employed both of which are constantly in mesh and both of which are driven from a single input shaft. Selection of the operation is controlled solely by selection of the direction of rotation of the input shaft. Furthermore, the shift from one drive to the other is accomplished without the use of any auxiliary devices for operating clutches but is accomplished solely through the use of gear reaction forces normally available in the transmission. Hence by this arrangement a simplified construction is provided having increased reliability at a lower manufacturing cost.

While the present invention has been described by reference to a particular embodiment thereof, it is to be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In a drive mechanism for an automatic clothes washer or the like, a reversible driving motor, a transmission input shaft driven by said motor, a spin drive spiral gear journaled on said shaft, one-way clutch means engaging said gear with said shaft on rotation thereof in a first direction, a worm driven by said shaft and a gear driven by said worm, an agitator shaft, a spin tube coaxial with said agitator shaft, an agitator pinion journaled on said agitator shaft, clutch means to engage said agitator pinion with said agitator shaft including means normally biasing said clutch into engagement, means oscillating said agitator pinion responsive to worm gear rotation, a spin tube spiral gear driven by said spin drive spiral gear, said spin tube spiral gear having a spline engagement with said spin tube, whereby input rotation in said first direction reacts to produce axial displacement of said spin tube spiral gear on said tube, and means associated with said spin tube spiral gear to disengage said agitator pinion clutch means responsive to said axial displacement.

2. In a drive mechanism for an automatic clothes washer or the like, a reversible driving motor, a transmission input shaft driven by said motor, a spin driving member journaled on said shaft, one-way clutch means engaging said spin driving member with said shaft on input rotation thereof in a first direction, an agitator driving member on said input shaft, an agitator shaft, a spin shaft coaxial with said agitator shaft, an agitator pinion journaled on said agitator shaft, clutch means to engage said agitator pinion with said agitator shaft including means normally biasing said clutch into engagement, means oscillating said agitator pinion responsive to rotation of said agitator driving member, a spin shaft driven member in engagement and driven by said spin driving member, said spin shaft driven member having a spiral spline engagement with said spin shaft permitting axial displacement of said spin shaft driven member responsive to reaction force upon input rotation in said first direction, and means associated with said spin shaft driven member to disengage said agitator pinion clutch means responsive to said axial displacement.

3. In a drive mechanism for an automatic clothes washer or the like, a reversible driving motor, a transmission input shaft driven by said motor, a spin drive gear journaled on said shaft, one-way clutch means engaging said gear with said shaft on rotation thereof in a first direction, an agitator shaft, a spin shaft coaxial with said agitator shaft, an agitator pinion journaled on said agitator shaft, clutch means to engage said agitator pinion with said agitator shaft including means normally biasing said clutch into engagement, means operated by rotation of said transmission input shaft for oscillating said agitator pinion, a spin shaft gear driven by said spin drive gear, said spin shaft gear having an inclined spline connection with said spin shaft whereby input rotation and torque transmission in said first direction reacts to produce axial displacement of said spin shaft gear on said spin shaft, and means associated with said spin shaft gear to disengage said agitator pinion clutch means responsive to said axial displacement.

4. In a drive mechanism for an automatic clothes washer or the like, a reversible driving motor, an input shaft driven by said motor, a spin drive spiral gear journaled on said shaft, one-way clutch means engaging said gear with said shaft on rotation thereof in a first direction, a worm journaled on said input shaft and having a hub with a cam surface, a drive pin projecting from said input shaft and engageable with said said worm hub cam surface to drive the same in rotation and cam the same axially on the input shaft upon rotation in said first direction, an agitator shaft, an agitator pinion journaled on said shaft, means constituting an oscillatory drive between said worm and said agitator pinion, a spin tube coaxial with said agitator shaft, clutch means to engage said agitator pinion with said agitator shaft including means normally biasing said clutch into engagement, an agitator pinion latch operable to hold said agitator clutch out of engagement responsive to axial movement of said worm on rotation in said first direction, a spin tube spiral gear driven by said spin drive spiral gear, said spin tube gear having a spline engagement with said spin tube whereby rotation in said first direction of said spin drive spiral gear reacts to produce axial displacement of said driven gear on said tube, and means operated by said axial displacement of said spin tube gear to move said agitator pinion clutch means to disengaged position.

5. In a drive mechanism for an automatic clothes washer or the like, a reversible driving motor, an input shaft driven by said motor, a spin drive spiral gear journaled on said shaft, one-way clutch means engaging said gear with said shaft on rotation thereof in a first direction, an agitator drive member on said input shaft having a driving connection therewith transmitting rotation and producing an axial thrust in a direction dependent upon the direction of rotation, an agitator shaft, an agitator pinion journaled on said shaft, means constituting an oscillatory drive between said agitator drive member and said agitator pinion, clutch means to engage said agitator pinion with said agitator shaft including means normally biasing said clutch into engagement, an agitator pinion latch operable to hold said agitator clutch out of engagement responsive to axial movement of said agitator drive member on rotation in said first direction, a spin tube coaxial with said agitator shaft, a spin tube spiral gear driven by said spin drive spiral gear, said spin tube gear having a spline engagement with said spin tube whereby rotation in said first direction of said spin drive spiral gear reacts to produce axial displacement of said driven gear on said tube, and means operated by said axial displacement of said driven gear to move said agitator pinion clutch means out of engagement.

6. In a transmission of the type providing output to one of two shafts selectively upon rotation of a single reversible input shaft, a spin drive spiral gear journaled on said input shaft and including one-way clutch means to engage said gear with said shaft upon rotation thereof in a first direction, a second gear train driving member journaled on said input shaft and having a hub thereon including a cam surface, a drive pin projecting transversely from said input shaft engageable with said gear drive member cam surface to drive the same in rotation and cam the same axially on the input shaft upon rotation in said first direction, a first output shaft, a second output tube coaxial with said output shaft, a pinion journalled on said output shaft, clutch means to engage said pinion with said output shaft including means normally biasing said clutch into engagement, means constituting a gear train between said second driving member and said pinion, a latch for said pinion operable to hold said clutch out of engagement responsive to axial movement of said second driving member on rotation thereof in said first direction, a tube driven spiral gear engaged by said spin drive spiral gear, said tube driven gear having a spline engagement with said tube whereby input rotation in said first direction results in axial displacement of said gear on said tube by means of gear reaction force, brake means associated with said tube biased into engagement, a brake latch operable to release said brake responsive to said axial movement of said tube gear, and means on said tube driven gear for moving said brake latch to released position and to disengage said pinion clutch responsive to said axial displacement thereof.

7. In a transmission of the type providing output to one of two shafts selectively upon rotation of a single reversible input shaft, a first drive gear journaled on said input shaft and including one-way clutch means to engage said gear with said shaft upon rotation thereof in a first direction, a second gear train driving member journaled on said input shaft and having a rotary driving connection therewith including a cam surface to produce axial displacement upon transmission of driving torque, a first output shaft, a second output shaft coaxial therewith, a pinion journaled on said second output shaft, clutch means to engage said pinion with said second output shaft including means normally biasing said clutch into engagement, means constituting a gear train between said second driving member and said pinion, a latch for said pinion operable to hold said clutch out of engagement responsive to said axial movement of said second driving member on rotation thereof in said first direction, a driven gear on said first output shaft engaged by said first drive gear, said driven gear having a rotary torque transmitting engagement with said first output shaft producing axial displacement upon transmission of torque, brake means associated with said first output shaft biased into engagement, a brake latch operable to release said brake responsive to said axial movement of said driven gear, and means on said driven gear for moving said brake latch to released position and to disengage said pinion clutch responsive to said axial displacement thereof.

8. In a drive mechanism for an automatic clothes washer, an agitator shaft for driving an agitator with an oscillatory motion, a drive system for said agitator shaft, a spin shaft coaxial with said agitator shaft for driving a spin basket in continuous high speed rotation, a drive shaft with means journaled thereon continuously in driving engagement with said agitator shaft drive system and said spin shaft respectively, means selective to rotate said drive shaft in one of two directions, first clutch means responsive to driving torque in one direction of drive shaft rotation to render only said agitation drive system effective, second clutch means responsive to driving torque in the opposite direction to render said spin shaft drive effective, and means responsive to reaction of said drive shaft means in driving engagement with said spin tube during rotation in said opposite direction to disengage said first clutch means.

9. In a drive mechanism for an automatic clothes washer or the like, an agitator shaft for driving a clothes washing means, a drive system for said agitator shaft, a spin tube coaxial with said agitator shaft for driving a centrifugal extraction means in high-speed rotation, a drive shaft with means journaled thereon continuously in driving engagement with said agitator shaft drive system and said spin tube respectively, means selective to rotate said drive shaft in one of two directions, first clutch means responsive to driving torque in one direction of drive shaft rotation to render only said agitation drive system effective, second clutch means responsive to driving torque in the opposite direction of rotation to render said spin tube drive effective, a brake for said spin tube means responsive to driving torque in said opposite direction to release said brake, and means responsive to reaction of said drive shaft means in driving engagement with said spin tube during rotation in said opposite direction to disengage said first clutch means.

10. In a clothes washer, a drive mechanism comprising an agitator shaft, a spin tube coaxial with said agitator shaft, a drive shaft including means thereon in driving engagement respectively with said agitator shaft and said spin tube respectively, means rotating said drive shaft selectively in one of two directions, direction responsive clutch means to effectively drive said agitator shaft for one direction of drive shaft rotation and said spin tube for opposite drive shaft rotation, a brake normally engaged to hold said spin tube against rotation, and means to release said brake rendered effective by drive reaction when said drive shaft is effectively engaged with said spin tube.

11. In a drive mechanism for an automatic washer of the type having a clothes basket adapted to be rotated at high speed for centrifugal extraction, a shaft for said basket, a frame supporting and journaling said shaft, drive means for said basket shaft including a spiral driving gear, a spiral driven gear splined to said basket shaft whereby drive results in an axial thrust on said gear, means biasing said driven gear in an opposite direction to said thrust, a brake band biased into engagement with said basket shaft and normally rotating therewith, said band including an outwardly extending tab, a latch means carried by said frame for arresting motion of said tab to brake said shaft, and means operated by said driven gear thrust to retain said latch means out of engagement with said tab.

12. In a drive mechanism for an automatic washer of the type having a clothes basket adapted to be rotated at high speed for centrifugal extraction, a shaft for said basket, a frame supporting and journaling said shaft, drive means for said basket shaft including a driving gear, a driven gear, means connecting said driven gear to said basket shaft permitting limited axial displacement thereof responsive to gear reaction thrust upon transmission of driving torque through said gears, a brake for said basket shaft, and means carried by said frame for operating said brake from an engaged position to a disengaged position responsive to said gear reaction thrust.

13. In a drive mechanism for an automatic washer of the type having a clothes basket adapted to be rotated at high speed for centrifugal extraction, a shaft for said basket, a frame supporting and journaling said shaft, drive means for said basket shaft including a drive gear, a driven gear splined to said basket shaft in a manner permitting axial movement of said driven gear responsive to transmission of torque to said basket shaft, means biasing said driven gear in an opposite direction to said thrust, a brake band biased into frictional engagement with said basket shaft and normally rotating therewith, means carried by said frame for arresting motion of said brake band, and means operated by axial movement of said driven gear upon transmission of torque to retain said brake arresting means out of engagement with said brake band.

14. In a drive mechanism for a clothes washer of the type having agitation means and a clothes basket rotatable for centrifugal extraction, a motor driven shaft with an agitator drive member and an extraction drive member thereon, said extraction drive member rotating with said motor shaft upon one direction of rotation, a shaft for said agitation means, a transmission including a clutch from said agitator drive member to said agitator shaft, means normally biasing said clutch into engagement, an extraction driven member connected to said clothes basket by means permitting limited movement relative thereto responsive to transmission of driving torque, and means operated by the torque responsive movement of said extraction driven member to overcome said biasing means and disengage said clutch.

References Cited in the file of this patent

UNITED STATES PATENTS

| | | |
|---|---|---|
| 1,897,414 | Baldner | Feb. 14, 1933 |
| 2,111,143 | Geldhof | Mar. 15, 1938 |
| 2,512,847 | Conterman | June 27, 1950 |
| 2,571,438 | Gerhardt | Oct. 16, 1951 |